United States Patent
Tanaka

(10) Patent No.: US 8,749,503 B2
(45) Date of Patent: Jun. 10, 2014

(54) TOUCH POSITION DETECTOR AND MOBILE CELL PHONE

(75) Inventor: Nao Tanaka, Daito (JP)

(73) Assignee: KYOCERA Corporation, Kyoto (JP)

( * ) Notice: Subject to any disclaimer, the term of this patent is extended or adjusted under 35 U.S.C. 154(b) by 283 days.

(21) Appl. No.: 13/170,835

(22) Filed: Jun. 28, 2011

(65) Prior Publication Data

US 2011/0316804 A1    Dec. 29, 2011

(30) Foreign Application Priority Data

Jun. 28, 2010  (JP) ................. 2010-145929

(51) Int. Cl.
*G06F 3/045*    (2006.01)

(52) U.S. Cl.
USPC .......................................... 345/173; 345/174

(58) Field of Classification Search
USPC .................. 345/156–184; 178/18.01–18.11
See application file for complete search history.

(56) References Cited

U.S. PATENT DOCUMENTS

| 7,982,723 B2 * | 7/2011 | Ningrat ........................ 345/174 |
| 2008/0150906 A1 * | 6/2008 | Grivna ........................ 345/173 |

FOREIGN PATENT DOCUMENTS

| JP | 03-180922 A | 8/1991 |
| JP | 07-013680 | 1/1995 |
| JP | 08-147091 A | 6/1996 |
| JP | 2010-244347 A | 10/2010 |
| JP | 2011-18177 A | 1/2011 |
| KR | 2009-0014820 A | 2/2009 |

OTHER PUBLICATIONS

Office Action dated Nov. 5, 2013 issued by the Japanese Patent Office for Japanese Patent Application No. 2010-145929.

* cited by examiner

*Primary Examiner* — Claire X Pappas
*Assistant Examiner* — Ngan Pham Lu

(57) ABSTRACT

A system and method for detecting a plurality of touch points on a touch panel is disclosed. A touch position detector comprises a touch panel, a detection module and an identification module. The touch panel comprises n+1 groups of mutually-parallel electrodes, and at least two of the n+1 groups are arranged at a predefined angle, where n is an integer. The detection module detects position information for each of the n+1 groups, and the position information corresponds to n touched positions on the touch panel. The identification module identifies the n touched positions based on the position information and the predefined angle.

20 Claims, 8 Drawing Sheets

TOUCH POSITION DETECTOR AND MOBILE CELL PHONE

CROSS-REFERENCE TO RELATED APPLICATION

The present application claims priority under 35 U.S.C. §119 to Japanese Patent Application No. 2010-145929, filed on Jun. 28, 2010, entitled "TOUCHED PLACE DETECTING DEVICE AND MOBILE PHONE". The content of which is incorporated by reference herein in its entirety.

FIELD

Embodiments of the present disclosure relate generally to touch detectors, and more particularly relate to a touch position detector for detecting two or more points.

BACKGROUND

Some electronic terminal devices comprise one or more touch panels. The touch panels may comprise multiple electrode wires in an x-direction and a y-direction that are mutually perpendicular. If a user touches a touched point on one of the touch panels, electrode wires in the x-direction and the y-axis direction that have been touched may be identified by measuring voltage changes in the electrode wires. A change in voltage of touched electrode wires differ from a change in voltage of untouched electrode wires. Accordingly, the touched point can be determined.

If a user touches two touched points simultaneously on the touch panel, two electrode wires are identified from each of the x-direction and the y-direction. As a result, there are four possible points of the electrode wires of the x-direction and the electrode wires of the y-direction, and thus the two touched points are not identified by existing methods.

SUMMARY

System and method for identifying multiple touched points on a touch panel are disclosed. A touch panel comprising groups of a plurality of electrodes arranged mutually parallel is provided. When n points are touched by a user on the touch panel, position information of each of the electrode groups corresponding to the n touched positions are detected respectively where n is an integer greater than 1. Furthermore, the n touched positions are detected based on detected position information and a predefined angular relationship.

In an embodiment, a touch position detector comprises a touch panel, a detection module, and an identification module. The touch panel comprises n+1 groups of mutually-parallel electrodes, and at least two of the n+1 groups are arranged at a predefined angle, where n is an integer greater than one. The detection module is operable to detect position information for each of the n+1 groups, and the position information correspond to n touched positions on the touch panel. The identification module is operable to identify the n touched positions based on the position information and the predefined angle.

In another embodiment, a touch panel identifies two or more touch points. A first electrode group comprising first electrodes is arranged mutually parallel on a first plane. A second electrode group comprising second electrodes is arranged mutually parallel on a second plane different from the first plane, and intersecting the first group of electrodes with a first angle in a planer view. Further, a third electrode group comprising third electrodes is arranged mutually parallel on a third plane different from the first plane and the second plane, and intersecting the first group of electrodes with a second angle different from the first angle in a planer view.

In yet another embodiment, a method for detecting a plurality of touch points on a touch panel provides a touch panel comprising (n+1) number of groups of a plurality of electrodes arranged mutually parallel, where n is an integer greater than one. The method further detects position information of each of the electrode groups corresponding to n number of touched locations respectively when n points are touched on the touch panel. The method also identifies the n number of touched positions based on detected position information and a predefined angular relationship.

BRIEF DESCRIPTION OF THE DRAWING

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a touch position detector in a cell phone. Embodiments of the disclosure, however, are not limited to such touch detector, and the techniques described herein may be utilized in other applications. For example, embodiments may be applicable to a touch detector in, for example but without limitation, mobile electronic devices, desktop electronic devices, digital books, digital cameras, electronic game machines, digital music players, personal digital assistance (PDA), personal handy phone system (PHS), lap top computers, Televisions (TV's), Global Positioning Systems (GPS's) or navigation systems, pedometers, health equipments, display monitors, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1A:
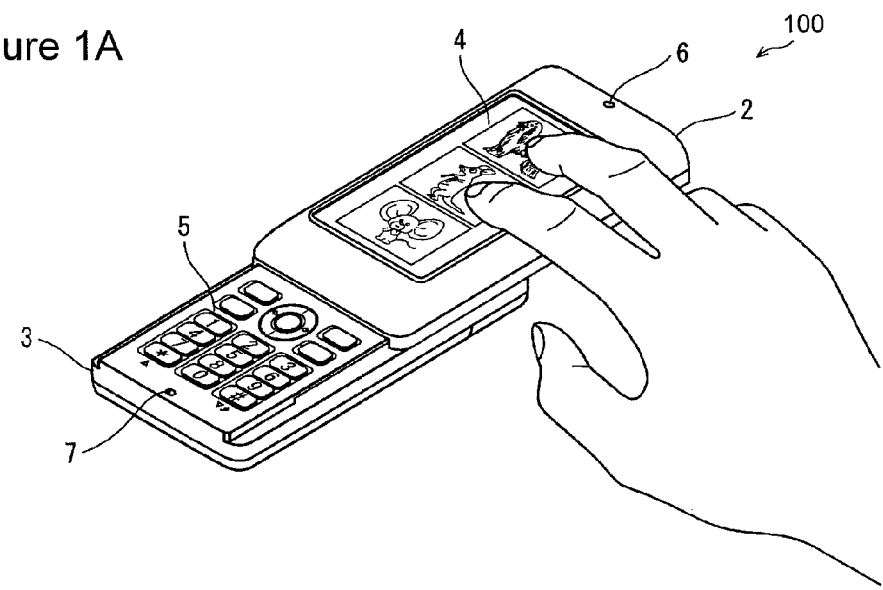
FIG. 1A is an illustration of a cell phone comprising a touch position detector according to an embodiment of the present disclosure.

FIG. 1A is an illustration of a cell phone 100 (mobile phone 100) comprising a touch position detector (touch detector 300 in FIG. 1B) according to an embodiment of the present disclosure. The mobile phone 100 may be, for example but without limitation, a sliding type in which a first chassis and a second chassis can slide in one direction from a state where the first chassis and the second chassis are overlapped; a folding type comprising a first chassis (manipulation-side chassis), a second chassis (display-side chassis) and a coupling portion coupling the chassis; a turning type in which one of the first chassis or the second chassis is made to turn around an axis line along an overlapping direction of a first chassis and a second chassis; a straight type in which the first chassis and the second chassis are arranged in one chassis comprising no coupling portion, and the like.

The mobile phone 100 comprises a chassis 2 and a chassis 3 which can be opened and closed relative to each other by sliding the chassis 2 relative to the chassis 3.

The chassis 2 comprises a display module 4, and a speaker 6 as explained in more detail below.

The chassis 3 comprises a key operation module 5 and a microphone 7 as explained in more detail below.

Figure 1B:
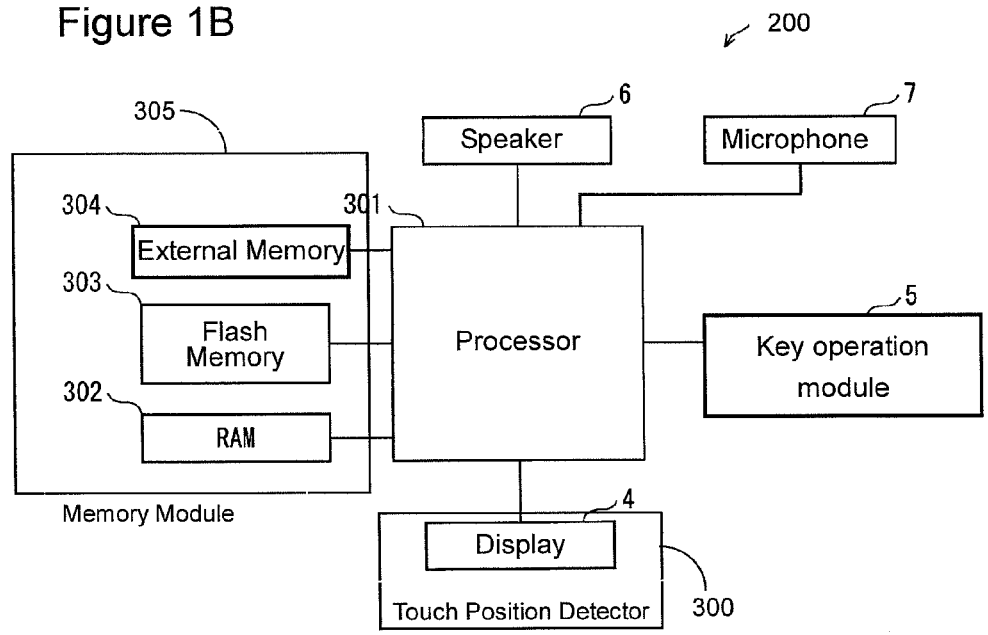
FIG. 1B is an illustration of an exemplary functional block diagram of the cell phone in FIG. 1A.

FIG. 1B is an illustration of an exemplary functional block diagram 200 (system 200) of a mobile electronic device such as the mobile phone 100. The system 200 comprises the touch detector 300, a processor module 301, the display module 4, the key operation module 5, the speaker 6, the microphone 7, a memory module 305 comprising; a Read Access Memory (RAM) 302, a flash memory 303, and an external memory 304.

A practical system 200 may comprise any number of input modules, any number of processor modules, any number of memory modules, and any number of display modules. The illustrated system 200 depicts a simple embodiment for ease of description. These and other elements of the system 200 are interconnected together, allowing communication between the various elements of system 200. In one embodiment, these and other elements of the system 200 may be interconnected together via a communication link (not shown).

Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The key operation module 5 comprises a keypad and the like to receive key inputs.

The speaker module 6 may emit sound to outside. The microphone 7 may acquire sound from outside.

The touch detector 300 is operable to detect a plurality of touch position information (x, y, z, w) on the touch panel 10 as explained in more detail below.

The processor module 310 is configured to support functions of the system 200. The processor module 310 may control operations of the system 200 so that processes of the system 200 are suitably performed. For example, the processor module 310 controls operations of the display module 4 to detect touched positions on the touch panel 10.

The processor module 310 also controls the display module 4 to display input/output parameters, and the like. Further, the processor module 310 accesses the memory module 305 for data, such as but without limitation, a position of a touch on the touch panel 10, an angle of intersection between the axes, axes components of an axis, an angle formed by the electrodes, axis position information, and the like.

The processor module 310, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 310 comprises processing logic that is configured to carry out the functions, techniques, and processing tasks associated with the operation of system 200.

The memory module 305 may comprise the RAM 302 used as a work area for the processor module 301. The flash memory 303 may store character data, image data and various other data used for the mobile phone 100, as well as program data and the like for performing processes. The external memory 304 comprises a removable recording medium, for example but without limitation, a recording medium such as an SD™ card a USB memory, or the like. The external memory 304 may store character data, image data and various other data used for the touch position detector (cell phone) 1, as well as program data and the like for performing processes together with the processor module 301.

The memory module 305 may be any suitable data storage area with suitable amount of memory that is formatted to support the operation of the system 200. The memory module 305 is configured to store, maintain, and provide data as needed to support the functionality of the system 200 in the manner described below. In practical embodiments, the memory module 305 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 305 may be coupled to the processor module 301 and configured to store, for example but without limitation, the coordinates of a touch point, angle between the axes, and the like.

Additionally, the memory module 305 may represent a dynamically updating database containing a table for purpose of computing using the processor module 301. The memory module 305 may also store, a computer program that is executed by the processor module 301, an operating system, an application program, tentative data used in executing a program processing, and the like. The memory module 305 may be coupled to the processor module 301 such that the processor module 301 can read information from and write information to memory module 305.

As an example, the processor module 301 and memory module 305 may reside in their respective ASICs. The memory module 305 may also be integrated into the processor module 301. In an embodiment, the memory module 305 may comprise a cache memory for storing temporary variables or other intermediate information during execution of instructions to be executed by the processor module 301.

When two points are touched at the same time on the display module 4, the touch position detector 300 detects the two touched points with touch-panel functions.

"Simultaneous touches" or "touching multiple points at the same time" refers not only to a case in which the touch periods of multiple points on the touch panel substantially completely match from the start to the end of the touch, but also a case in which the touch periods of multiple touches are partially overlapped.

"Simultaneous detection" comprises detecting multiple touch positions during a period of simultaneous touches in which a plurality of points are touched at the same time on the touch panel.

First, a two-point simultaneous detection function is described.

Figure 2:
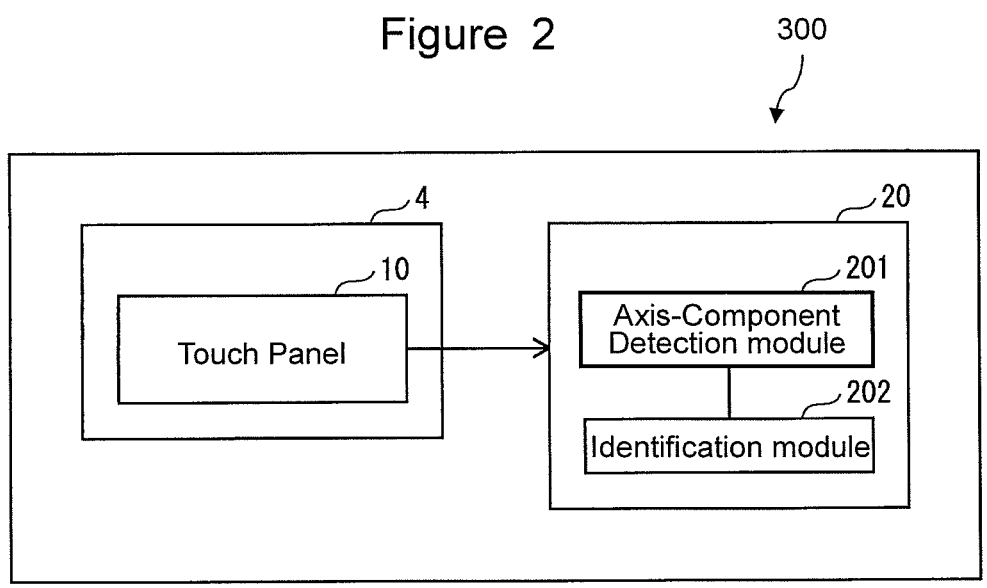
FIG. 2 is an illustration of an exemplary functional block diagram of a touch position detector according to an embodiment of the present disclosure.

FIG. 2 is an illustration of an exemplary functional block diagram of a touch position detector 300 (touch detector 300) according to an embodiment of the present disclosure.

The touch position detector 300 comprises the display module 4, a detection processing module 20 for a two-point simultaneous detection function.

The display module 4 comprises the touch panel 10 (FIG. 3). The display module 4 receives input via a user such as a user touch on the touch panel 10. The display module 4 is configured to display various kinds of information via an image/video signal supplied from the processor module 301. The display module 4 may accept a user input via the user touch to input and transmit data, and input operation commands for functions provided in the system 200/300.

The display module 4 accepts the operation command, and outputs operation command information to the processor module 301 in response to the accepted operation command. The display module 4 may be formed by, for example but without limitation, an organic electro-luminescence (OEL) panel, liquid crystal panel (LCD), and the like.

Figure 3A:
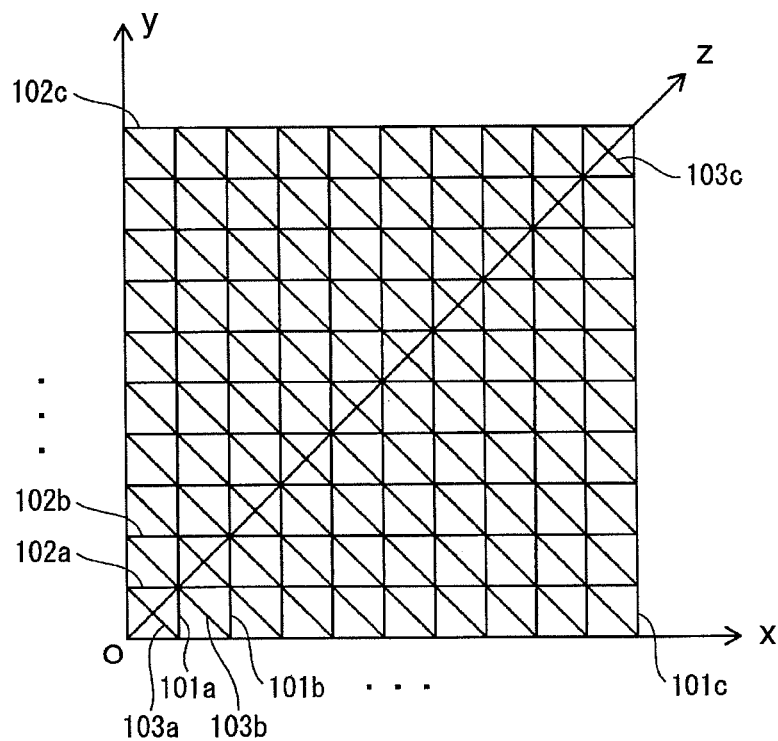
FIG. 3A is an illustration of a schematic view of an exemplary arrangement of electrodes according to an embodiment of the present disclosure.

In one embodiment, the touch panel 10 may comprise a self-capacitance type touch panel. The touch panel 10 is operable to simultaneously detect at least two points that have been touched by user's fingers. The touch panel 10 comprises a plurality of electrodes corresponding to each of the x-axis, the y-axis and the z-axis like a finely meshed pattern as shown in FIG. 3A below.

In one embodiment, the touch position detector 300 comprises functions such as the key operation part 5 and component parts related to communication functions.

The detection processing module 20 comprises an axis-component detection module 201, and an identification module 202.

The axis-component detection module 201 detects the x-axes, y-axes and z-axes components of an axis comprising a touched point on the touch panel 10. These components comprise position information for each respective electrode group.

The identification module 202 identifies the touched two points based on the x-axes, y-axes and z-axes components of each axis detected by the axis-component detection module 201.

FIG. 3A is an illustration of a schematic view of an exemplary arrangement of electrodes according to an embodiment of the present disclosure.

As mentioned above, the touch panel 10 comprises a plurality of electrodes corresponding to each of the x-axis, the y-axis and the z-axis like a finely meshed pattern.

A first electrode group comprises first electrodes 101a, 101b . . . 101c that are perpendicular to the x-axis and are configured to identifying a touched component of the x-axis. A second electrode group comprises second electrodes 102a, 102b . . . 102c that are perpendicular to the y-axis and are configured to identify a touched component of the y-axis. A third electrode group comprises third the electrode 103a, 103b . . . 103c that are perpendicular to the z-axis and are configured to identify a touched component of the z-axis. The electrodes may comprise, for example but without limitation, transparent electrodes, and the like.

In one embodiment, the x-axis is a horizontal axis and the y-axis is a vertical axis. The electrodes 101a, 101b . . . 101c are perpendicular to the electrodes 102a, 102b . . . 102c.

In one embodiment, the position information of each electrode group, comprises a distance (length) from an intersection point O where the three axes (x-axis, y-axis and z-axis) intersect to a touch point. The x-axis, y-axis and z-axis constitute a two-dimensional coordinate system. The intersection point O is an origin of the X-Y-Z coordinate system. The distance from the intersection point O to the touch point comprises respective components of each axis.

In one embodiment, the x-axis and the y-axis are perpendicular to one another. In another embodiment, the x-axis and the y-axis are not perpendicular to one another. Thus, an angle $\theta_{xy}$ (FIG. 3B) between the x-axis and the y-axis is not necessarily 90°. For example, $\theta_{xy}$ may be approximately 90° such as 87° or 89°. However, making the angle $\theta_{xy}$ 90° can simplify calculations and reduce CPU load.

Figure 3B:
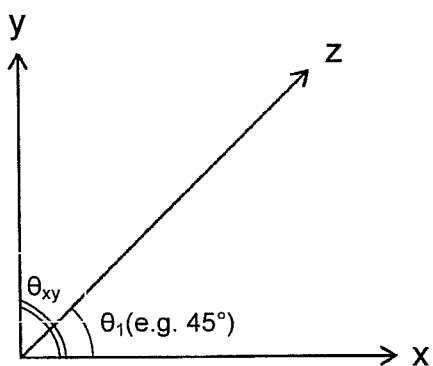
FIG. 3B is an illustration of an exemplary coordinate comprising an x-axis, a y-axis, and a z-axis component of a plurality of electrode groups according to an embodiment of the present disclosure.

FIG. 3B is an illustration of an exemplary coordinate comprising an x-axis, a y-axis, and a z-axis component of various electrode groups according to an embodiment of the present disclosure. In one embodiment, the x-axis, the y-axis and the z-axis are on the same plane and the z-axis intersects the x-axis at a 45° angle.

Figure 4A:
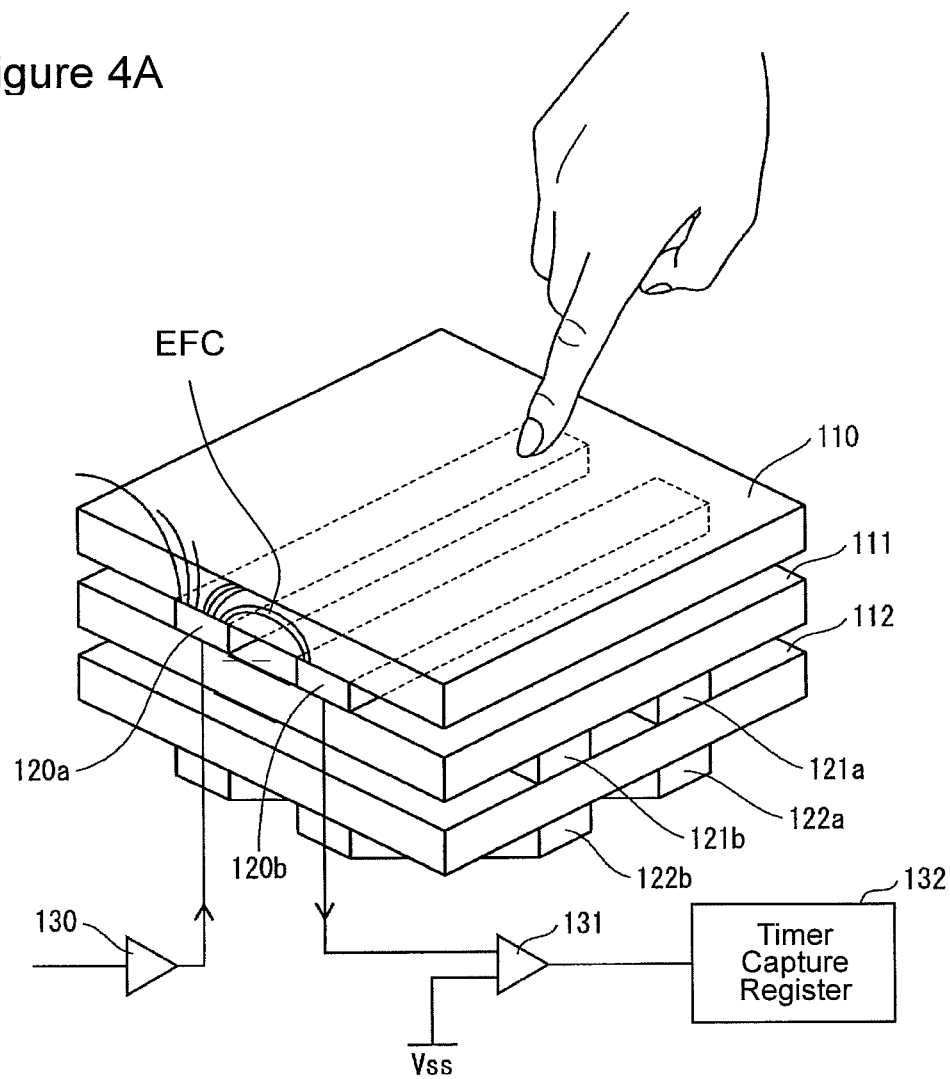
FIG. 4A is a schematic view illustrating a configuration of the touch panel.

FIG. 4A is an illustration of a schematic view of the touch panel 10 according to an embodiment of the present disclosure. The touch panel 10 comprises a dielectric body 110, 111 and 112, an x-electrode 120a and 120b, a y-electrode 121a and 121b, a z-electrode 122a and 122b, a pulse drive buffer 130, a voltage comparator 131 and a timer capture register 132. Vss in FIG. 4A indicates a source voltage which is used as a reference voltage by the voltage comparator 131.

The x-electrode 120a and 120b, the y-electrode 121a and 121b, and the z-electrode 122a and 122b correspond to the electrode 101a, 101b . . . 101c of FIG. 3A, the electrode 102a, 102b . . . 102c of FIG. 3A, and the electrode 103a, 103b . . . 103c of FIG. 3A, respectively.

The touch panel 10 may comprise a layer structure, and the dielectric body 110, the first electrode group (the x-electrode 120a and 120b), a dielectric body 111, the second electrode group (the y-electrode 121a and 121b), a dielectric body 112, and the third electrode group (the z-electrode 122a and 122b) are arranged in that order from the top layer to the bottom layer in FIG. 4A.

Figure 4B:
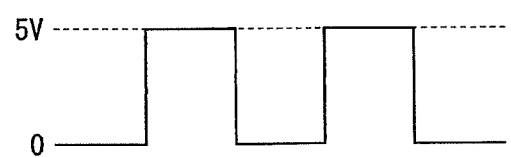
FIG. 4B is an illustration of a diagram showing a pulse signal applied to an electrode on x-axis according to an embodiment of the present disclosure.

FIG. 4B is an illustration of a diagram showing a pulse signal applied to the electrode 120a (FIG. 4a) on x-axis according to an embodiment of the present disclosure. The pulse drive buffer 130 is electrically coupled to the x-electrode 120a. The pulse drive buffer 130 is configured to send pulse signals, for example and without limitation, with 0 V for Low and 5 V for High to the x-electrode 120a at a frequency of 1 cycle/100 second. Similarly, separate pulse drive buffers are also electrically coupled to each of the y-electrode 121a and the z-electrode 122a (not shown in FIG. 4A).

The voltage comparator 131 is electrically coupled to the x-electrode 120b. The voltage comparator 131 compares the voltage of the x-electrode 120b with voltages of 5 V and 0 V, and decides the voltage of the x-electrode 120b. The decided result is sent to the timer capture register 132 from the voltage comparator 131. Referring to the result, the timer capture register 132 identifies whether voltage of the pulse signals changes at the frequency of 1 cycle/100 second.

Similarly, separate voltage comparators and timer capture registers are also electrically coupled to each of the y-electrode 121b and the z-electrode 122b (not shown in FIG. 4A).

More specifically, if the x-electrode 120a receives a pulse signal from the pulse drive buffer 130, the same or similar voltage as applied to the x-electrode 120a is also applied to the x-electrode 120b as a result of electric field coupling (shown as "EFC" in FIG. 4A). In a capacitive touch panel, when a given point is touched, a charge is accumulated in the electrode immediately below, and the rise (from 0 V to 5 V) of the pulse signal input from the pulse drive buffer 130 becomes dull. In other words, the periodic changes in voltage at a cycle of 1/100 second become disorderly. By identifying this change, the timer capture register identifies this change and determines that at least one of either the x-electrode 120a or the x-electrode 120b has been touched.

For each of the y-axis electrodes 121a and 121b and the z-axis electrodes 122a and 122b as well, similar principles are applied to determine whether they have been touched. That is, in an embodiment, the pulse drive buffer 130 produces a pulse signal as shown in FIG. 4B. When a user touches the touch panel (or dielectric body 110 in FIG. 4A) with his/her finger, a pulse signal is sent to the voltage comparator 131 as a result of electric field coupling (shown as "EFC" in FIG. 4A). In an embodiment, the timer capture register 132 measures each regular pulse and record the measured results. With the measured results from the timer capture register 132, the touch panel 10 can determine whether a user touches the touch panel 10.

In practice, a detector comprising more than three electrodes that are electrically coupled to separate time capture resistors, when detecting an x-axis component, the axis-component detection module 201 detects two components where the periodic changes have become disorderly by using the functions of each timer capture register electrically coupled to each x-electrode.

Similarly, for the y-axis and the z-axis, the axis-component detection module 201 also detects two components where the periodic changes have become disorderly by using the functions of each timer capture register electrically coupled to each y-electrode and each z-electrode.

The axis-component detection module 201 can detect X1 and X2 as x-axis components, Y1 and Y2 as y-axis components and Z1 and Z2 as z-axis components.

The two touched points that have been touched are identified as described below.

Figure 5:
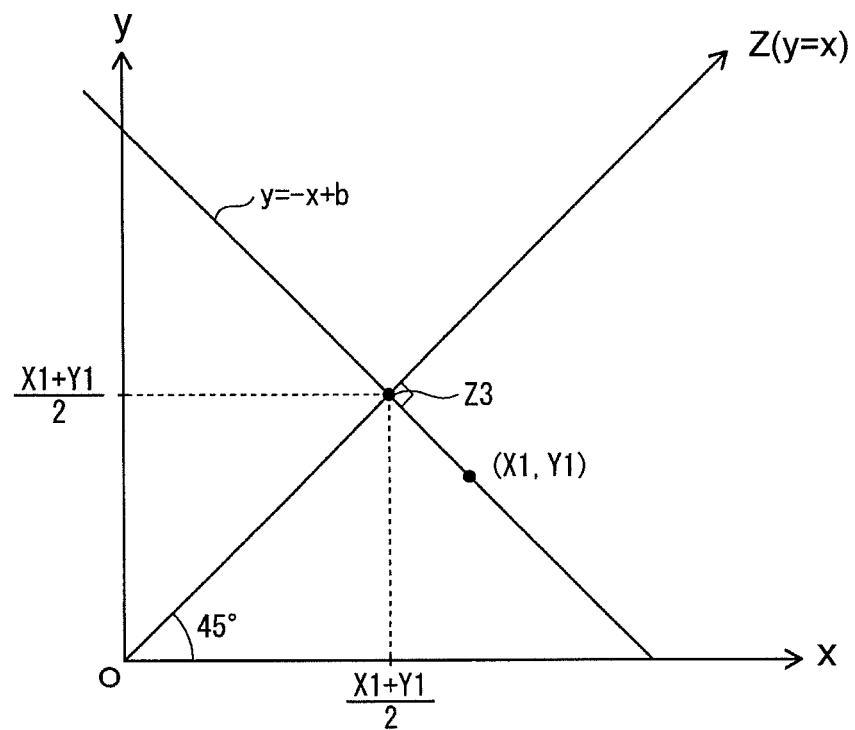
FIG. 5 is an illustration of a diagram showing a relationship between a z-axis component, an x-axis component and a y-axis component of electrodes according to an embodiment of the present disclosure.

FIG. 5 is an illustration of a diagram showing a relationship between a z-axis component, an x-axis component and a y-axis component of electrodes according to an embodiment of the present disclosure. The identification module 202 selects a point (X1, Y1) which is a combination of the x-axis component X1 and y-axis component Y1 detected by the axis-component detection module 201. The identification module 202 then calculates a z-axis component Z3 that corresponds to the selected (X1, Y1) using equation 1 as shown below.

$$Z3 = \frac{X1 + Y1}{\sqrt{2}} \qquad (1)$$

The identification module 202 determines whether the calculated result Z3 is equivalent to either of the components Z1 or Z2 detected by the axis-component detection module 201. If it is determined that the result Z3 is equivalent to either, the identification module 202 identifies the selected combination (X1, Y1) and the remaining combination (X2, Y2) as indications of the correct positions that have been touched. If it is determined that the calculated result Z3 is equivalent to neither of the components Z1 nor Z2, the identification module 202 decides the selected combination (X1, Y1) is incorrect, and identifies the other combinations (X1, Y2) and (X2, Y1) as indications of the correct positions that have been touched.

The following describes how the z-axis component Z3 corresponding to the selected combination (X1, Y1) in equation 1 is obtained.

Since the angle between the z-axis and the x-axis is 45°, the z-axis is represented by the linear function "y=tan $\theta_1 \cdot$x". Since the z-electrodes passing through (X1, Y1) are perpendicular to the z-axis, it is represented by the linear function "y=−x+b". Moreover, (X1, Y1) passes through the linear function "y=−x+b", and as a result is represented as "b=X1+Y1", and the linear function "y=−x+b" can be converted to "y=−x+(X1+Y1)".

The z-axis component Z3 corresponding to the selected (X1, Y1) can be calculated based on the intersection point of the linear function "y=x" and the linear function "y=−x+(X1+Y1)".

When the intersection point of the linear function "y=x" and the linear function "y=−x+(X1+Y1)" is calculated, the x-axis component of the intersection point becomes "(X1+Y1)/2", and the y-axis component of the intersection point becomes "(X1+Y1)/2".

The z-axis component Z3 is the hypotenuse of the right triangle formed by the perpendicular relationship between the x-axis component "(X1+Y1)/2" and the y-axis component "(X1+Y1)/2". Based on the Pythagorean theorem, the equation 1 is obtained.

Figure 6:
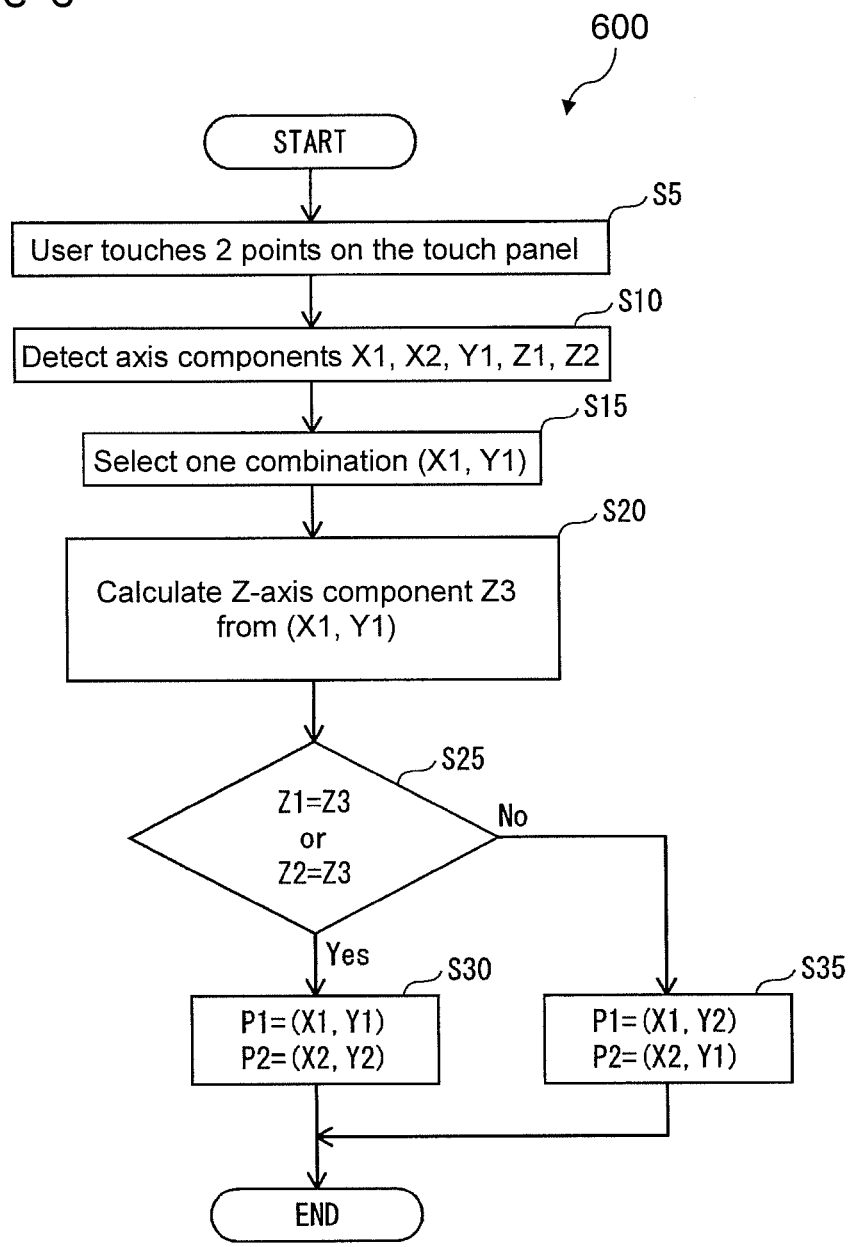
FIG. 6 is an illustration of a flowchart showing a detection process for detecting two touched points simultaneously in a touch detector according to an embodiment of the present disclosure.

FIG. 6 is an illustration of a flowchart showing a detection process 600 for detecting two touched points simultaneously in the touch detector 200 according to an embodiment of the present disclosure. The various tasks performed in connection with process 600 may be performed, by software, hardware, firmware, a computer-readable medium having computer executable instructions for performing the process method, or any combination thereof.

The process 200 may be recorded in a computer-readable medium such as a semiconductor memory, a magnetic disk, an optical disk, and the like, and can be accessed and executed, for example, by a computer CPU such as the processor module 301 in which the computer-readable medium is stored. For example, the medium for recording the process 200 may comprise, for example but without limitation, the flash memory 303, the external memory 304 such as a USB memory, an SD Card™, and the like.

It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-5.

In practical embodiments, portions of the process 600 may be performed by different elements of the system 200 such as: the touch detector 300, the processor module 301, the display module 4, the key operation module 5, the speaker 6, the microphone 7, the memory module 305 etc. Process 600 may have functions, material, and structures that are similar to the embodiments shown in FIGS. 1-5. Therefore common features, functions, and elements may not be redundantly described here.

The process 600 may begin by a user touching two points on the touch panel 10 (task S5).

The process 600 may continue by the axis-component detection module 201 detecting a position X1 and a position X2 as x-axis components, a position Y1 and a position Y2 as y-axis components, and a position Z1 and a position Z2 as z-axis components, y-axis components, and z-axis components respectively based on the functions of each of multiple timer capture registers provided to each axis, (task S10).

The process 600 may continue by the identification module 202 selecting one combination (X1, Y1) comprising the x-axis and the y-axis detected by the axis-component detection module 201 (task S15).

The process 600 may continue by the identification module 202 calculating the z-axis component Z3 corresponding to the selected (X1,Y1) using equation 1 as shown above (task S20), and determining whether the calculated result Z3 is equivalent to at least one of either of the detected z-axis components Z1 or Z2 (inquiry task S25).

If it is determined that Z3 is equivalent to at least one of either Z1 or Z2 ("Yes" branch of inquiry task S25), the identification module 202 identifies the selected combination (X1, Y1) and the remaining combination (X2, Y2) as indications of the correct positions that have been touched (task S30).

If it is determined that Z3 is not equivalent to either Z1 or Z2 ("No" branch of inquiry task S25), the identification module 202 identifies the other combinations (X1, Y2) and (X2, Y1) as indications of the correct positions that have been touched (task S35).

In the embodiment described above, the z-axis forms a 45° angle with the x-axis. In other words, the electrodes 103a, 103b . . . 103c form a 45° angle with the electrodes 101a, 101b . . . 101c.

The x-axis and the z-axis need an intersection, and the angle of intersection may be $\theta_1$ ($0°<\theta_1<90°$). In other words, the x-axis, the y-axis and the z-axis need to intersect with one another. In this case, the angle formed by the electrodes 101a, 101b . . . 101c, which are perpendicular to the x-axis, and the electrodes 103a, 103b . . . 103c, which are perpendicular to the z-axis, also are also $\theta_1$.

In this case, using equation 2 as shown below, the identification module 202 determines whether the selected (X1, Y1) is equivalent to at least one of the detected components Z1 or Z2.

$$Z3 = X1 \cdot \cos\theta_1 + Y1 \sin\theta_1 \qquad (2)$$

If it is determined that the result Z3 is equivalent to either, the identification module 202 identifies the selected combination (X1, Y1) and the remaining combination (X2, Y2) as indications of the correct positions that have been touched. If it is determined that the calculated result Z3 is equivalent to neither of the components Z1 nor Z2, the identification module 202 identifies the other combinations (X1, Y2) and (X2, Y1) as indications of the correct positions that have been touched.

The following describes how the z-axis component Z3 corresponding to the combination (X1, Y1) selected using equation 2 is obtained when the angle between the z-axis and the x-axis is $\theta_1$.

Since the angle between the z-axis and the x-axis is $\theta_1$, the z-axis is represented by the linear function "$y=\tan\theta_1 \cdot x$". Since the z-electrodes passing through (X1, Y1) are perpendicular to the z-axis, they are represented by the linear function "$y=(-1/\tan\theta_1)\cdot x+b$". Moreover, (X1,Y1) passes through the linear function "$y=(-1/\tan\theta_1)\cdot x+b$", and as a result is represented as "$b=(1/\tan\theta_1)\cdot X1+Y1$", and the linear function "$y=-x+b$" can be converted to "$y=-x+((1/\tan\theta_1)\cdot X1+Y1)$".

The z-axis component Z3 corresponding to the selected (X1,Y1) may be calculated based on the intersection point of the linear function "$y=\tan\theta_1 \cdot x$" and the linear function "$y=(-1/\tan\theta_1)\cdot x+((1/\tan\theta_1)\cdot X1+Y1)$".

When the intersection point of the linear function "$y=\tan\theta_1 \cdot x$" and the linear function "$y=(-1/\tan\theta_1)+((1/\tan\theta_1)\cdot X1+Y1)$" is calculated, the x-axis component of the intersection point becomes "$(X1+\tan\theta_1 \cdot Y1)/(\tan^2\theta_1+1)$", and the y-axis component of the intersection point becomes "$\tan\theta_1(X1+\tan\theta_1 \cdot Y1)/(\tan^2\theta_1+1)$".

Figure 7:
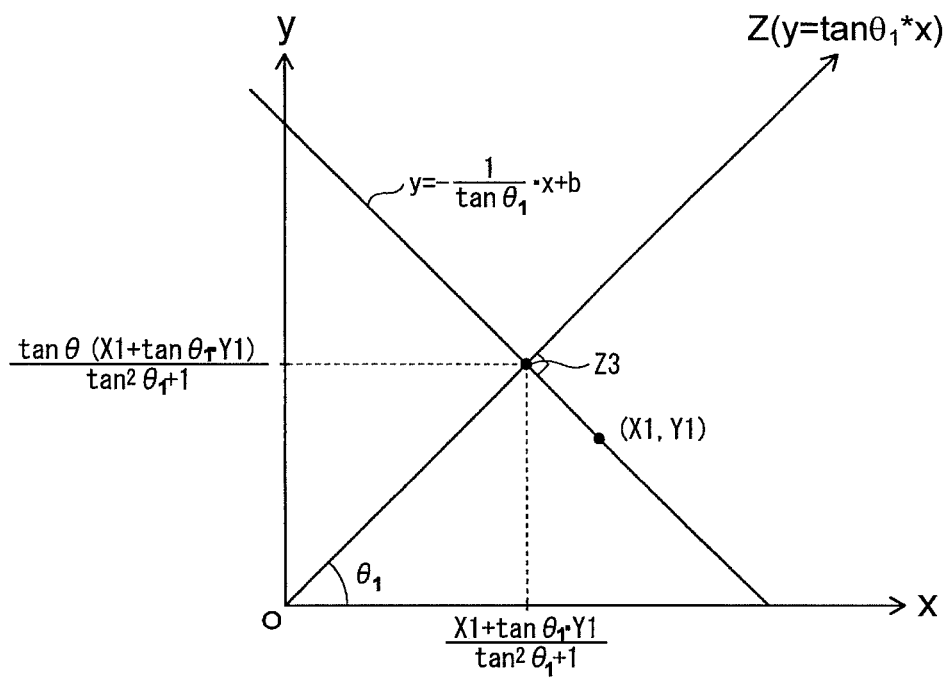
FIG. 7 is an illustration of a diagram showing a relationship between a z-axis component, an x-axis component and a y-axis component of electrodes with the x-axis and the z-axis having an angle θ therebetween according to an embodiment of the present disclosure.

FIG. 7 is an illustration of a diagram showing a relationship between a z-axis component, an x-axis component and a y-axis component of electrodes with the x-axis and the z-axis having an angle θ therebetween according to an embodiment of the present disclosure.

The z-axis component Z3 is the hypotenuse of the right triangle formed by the perpendicular relationship between the x-axis component "(X1+Y1)/2" and the y-axis component "(X1+Y1)/2". Based on the Pythagorean theorem, the following relationship is formed: "$(Z3)^2=(\tan\theta_1 \cdot Y1+X1)^2/(\tan^2\theta_1+1)$". Here, as a result of the relational expressions "$\tan^2\theta_1+1=1/\cos^2\theta_1$" and "$\tan\theta_1=\sin\theta_1/\cos\theta_1$", the relationship becomes "$(Z3)^2=(X1+\tan\theta_1 \cdot Y1)^2/(\tan^2\theta_1+1)=(X1+(\sin$ $\theta_1/\cos\theta_1)\cdot Y1)^2\cdot\cos^2\theta_1$". This leads to "$Z3=(X1+(\sin\theta_1/\cos\theta_1)\cdot Y1)\cdot\cos\theta_1=X1\cdot\cos\theta_1+\sin\theta_1\cdot Y1$".

The simultaneously detected locations of a touch position detector are not limited to two. The touch position detector may simultaneously detect three or more locations. In other words, the touch position detector of the present disclosure may provide n+1 number of axes and simultaneously detect n number of points. The following is a description of a mode for simultaneously detecting three points. n may be, for example but without limitation, greater than 1, and the like.

In this case, z axis forms an angle $\theta_2$ with the x axis, similar to the above embodiments. Furthermore, w axis which forms an angle of 90 degrees with z axis is added. Thus, similar to the above-mentioned embodiments, a touch panel includes w electrodes which are parallel to each other and are perpendicular to the w axis as well as x-electrode, y-electrodes, z-electrodes as described above.

The angle $\theta_{xy}$ between the x-axis and the y-axis is not necessarily 90°. For example, the angle $\theta_n$, may be approximately 90° such as 87 or 89°. However, making the angle $\theta_{xy}$ 90° can simplify calculations and reduce CPU load.

According to an embodiment, as shown in FIG. 3A, a touch position detector may further include a dielectric body and w-axis electrodes below the z-axis electrodes. In addition, w-axis electrode may be electrically coupled to a pulse drive buffer, a voltage comparator and a timer capture register. The z-axis electrodes may include transparent electrodes, similar to other electrodes.

The axis-component detection module 201 detects axis components or a position that has been touched in each of the x-axes, y-axes, z-axes and w-axes. For example, the axis-component detection module 201 may detect a position X1, a position X2 and a position X3 as x-axis components or x-axis positions, a position Y1, a position Y2 and a position Y3 as y-axis components or y-axis positions, a position Z1, a position Z2 and a position Z3 as z-axis components or z-axis positions, and a position W1, a position W2 and a position W3 as w-axis components or w-axis positions.

Using equation 3, the identification module 202 can identify three groups of x-axis components, y-axis components, z-axis components and w-axis components that meet the conditions of equation 3 from among the x-axis components (X1, X2, X3), the y-axis components (Y1, Y2, Y3), the z-axis components (Z1, Z2, Z3) and the w-axis components (W1, W2, W3).

$$\begin{bmatrix} x \\ y \end{bmatrix} = \begin{bmatrix} \cos\theta_2 & -\sin\theta_2 \\ \sin\theta_2 & \cos\theta_2 \end{bmatrix} \times \begin{bmatrix} z \\ w \end{bmatrix} \quad (3)$$

The identification module 202 can identify the x-axis component and y-axis component of each identified group as an indication of a correct position that has been touched.

By using equation 3, it is possible to rotate the z-w axis to match the x-y axis, and determine whether the detected position defined on the x-y axis and the position defined on the z-w axis match. In this manner, when the z-w axis matches the x-y axis, they can be identified as positions that have actually been touched.

Figure 8A:
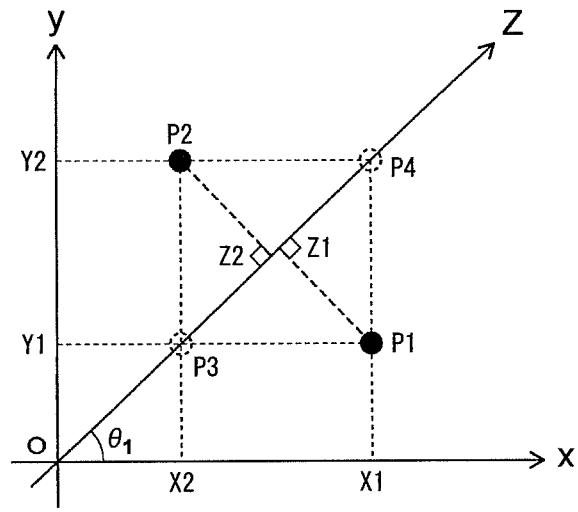
FIG. 8A is an illustration of a diagram showing an exemplary coordinate for detecting two touched points according to an embodiment of the present disclosure.

FIG. 8A is an illustration of a diagram showing an exemplary coordinate for detecting two and three touched points according to an embodiment of the present disclosure.

P1 (X1, Y1) and P2 (X2, Y2) are assumed to be positions that have actually been touched. In this case, by using the x-axis electrodes, y-axis electrodes and z-axis electrodes, X1, X2, Y1, Y2, Z1 and Z2 are detected. As a result, in addition to the abovementioned P1 and P2, combinations of x-axis components and y-axis components include P3 (X2, Y1) and P4 (X1, Y2). Therefore, the identification module 202 selects one combination from among these combinations. If, hypothetically, the selected combination is correct (i.e., if it indicates a position that has actually been touched), the z-axis component corresponding to the selected combination will match either of the detected Z1 or Z2.

If the identification module 202 selects P1, the z-axis component corresponding to P1 is Z1, and because Z1 has actually been detected, the selected P1 is correct. As a result, the remaining combination comprising the x-axis component and the y-axis component is necessarily P2, and this is also a position that has actually been touched.

If the identification module 202 selects P3, the z-axis component corresponding to P3 does not match either of the actually detected Z1 or Z2. As a result, it becomes known that the selected P3 is a mistake (i.e., a position that has not been touched). Moreover, it also becomes known that the remaining combination (in this case, P4) composed of the x-axis component and the y-axis component when P3 is selected is also a position that has not been touched. Therefore, the identification module 202 identifies combinations different from P3 and P4 (i.e., P1 and P2) as correct.

Figure 8B:
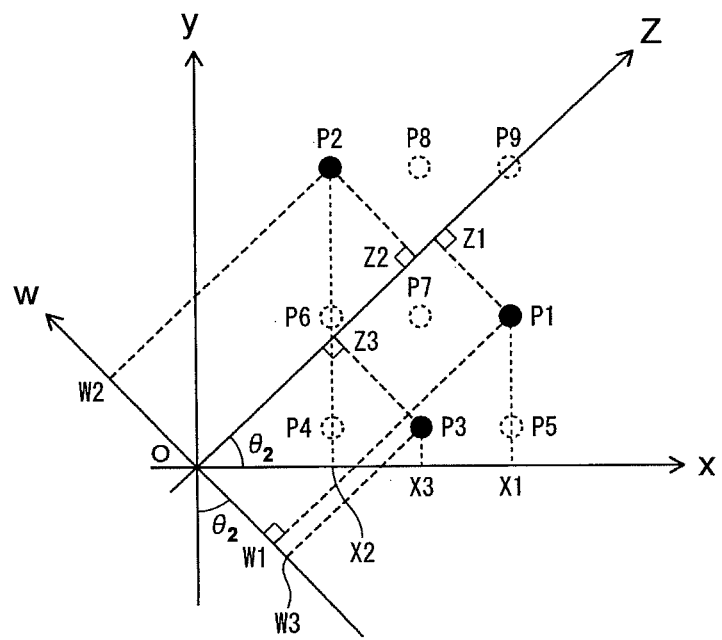
FIG. 8B is an illustration of a diagram showing an exemplary coordinate for detecting three touched points according to an embodiment of the present disclosure.

FIG. 8B is an illustration of a diagram showing an exemplary coordinate for detecting three touched points according to an embodiment of the present disclosure.

Positions P1 (X1, Y1), P2 (X2, Y2) and P3 (X3, Y3) are assumed to have actually been touched. In this case, by using the x-axis electrodes, y-axis electrodes, z-axis electrodes and the w-axis electrodes, position information x comprising position X1, position X2, position X3, position information y comprising position Y1, position Y2, position Y3, position information z comprising position Z1, position Z2, position Z3, and position information w comprising position W1, position W2 and position W3 are detected. As a result, in addition to P1 and P2 as shown in FIG. 8A, combinations of x-axis components and y-axis components also include P4 through P9 as shown in FIG. 8B.

Then, using equation 3, the identification module 202 can identify three combinations that are consistent with this equation. In this example, (X1, Y1, Z1, W1), (X2, Y2, Z2, W2) and (X3, Y3, Z3, W3) may be identified.

The identification module 202 can identify the positions defined by the x-axis components and the y-axis components comprising each of the three combinations identified as positions that have been touched. In this example, (X1, Y1), (X2, Y2) and (X3, Y3) are identified as positions that have been touched.

In the embodiment described above, n number of axis components of each axis corresponding to the touched positions are detected, but the present invention is not limited thereto. The detection method described above may be applied even if n number or fewer axis components are detected for each axis.

For example, in the two-point simultaneous detection, a corresponding z-axis component is calculated using equation 1 for each combination of a detected x-axis component and y-axis component, and it is verified whether an axis component equivalent to the calculated axis component has been detected. As a result, two-point simultaneous detection is performed.

Similarly, for three-point simultaneous detection, it is necessary to perform verification using equation 2 for each combination of a detected x-axis component and y-axis component.

In an embodiment, based on position information detected from a touch panel having n+1 number of electrode groups that have predefined angular relationships, the touch position detector identifies n number of combinations that have been touched based on the predefined angular relationships, and therefore, it is possible to properly detect the n number of positions that have been touched.

In an embodiment, the position information for each electrode group (101, 102, and 103 in FIG. 4A) may comprise an axis component of an axis provided in a direction perpendicular to the electrodes.

In this manner, by using the axis provided in a direction perpendicular to the electrodes (101*a*, 101*b* . . . 102*a*, 102*b* . . . 103*a*, 103*b* . . . ) in the electrode group (101, 102, 103 in FIG. 4A), the touch position detector 300 identifies position information for each of the electrode group (101, 102, 103 in FIG. 4A).

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A touch position detector comprising:
   a touch panel comprising at least three groups of mutually-parallel electrodes, at least two of the at least three groups arranged at a predefined angle;
   a detection module operable to detect position information for each of the at least three groups, the position information corresponding to n touched positions on the touch panel, the detection module operable to
      detect position information x comprising a position X1 and a position X2 of a first electrode group;
      detect position information y comprising a position Y1 and a position Y2 of a second electrode group;
      detect position information z comprising a position Z1 and a position Z2 of a third electrode group; and
   an identification module operable to identify the n touched positions based on the position information and the predefined angle, the identification module operable to
      calculate a calculated position Z3 based on the position X1 and the position Y1;
      identify coordinates (X1, Y1), (X2, Y2) as one of the touched positions, if the calculated position Z3 is equal to at least one of the position Z1 and the position Z2; and
      identify coordinates (X1, Y2), (X2, Y1) as one of the touched positions, if the calculated position Z3 is not equal to at least one of the position Z1 and the position Z2.

2. The touch position detector according to claim 1, wherein the at least three groups are arranged with the predefined angle to mutually intersect.

3. The touch position detector according to claim 1, wherein
   the first electrode group comprising first electrodes;
   the second electrode group comprising second electrodes, wherein the first electrodes and the second electrodes intersect at approximately 90 degrees; and
   the third electrode group comprising third electrodes, wherein the first electrodes and the third electrodes form the predefined angle at an angle $\theta_1$.

4. The touch position detector according to claim 1, wherein the calculated position Z3 is calculated based on the following relationship:

$$Z3 = X1 \cdot \cos\theta_1 + Y1 \cdot \sin\theta_1.$$

5. The touch position detector according to claim 1, wherein:
   the first electrode group comprises first electrodes;
   the second electrode group comprises second electrodes, wherein the first electrodes and the second electrodes intersect at approximately 90 degrees;
   the third electrode group comprises third electrodes, wherein the first electrodes and the third electrodes form the predefined angle at a angle $\theta_2$; and the touch panel further comprises a fourth electrode group comprising fourth electrodes,
   wherein the third electrodes and the fourth electrodes intersect at approximately 90 degrees.

6. The touch position detector according to claim 5, wherein the detection module is further operable to detect:
   detected position information x comprising a position X1, a position X2 and a position X3 of the first electrode group;
   detected position information y comprising a position Y1, a position Y2 and a position Y3 of the second electrode group;
   detected position information z comprising a position Z1, a position Z2 and a position Z3 of the third electrode group; and
   detected position information w comprising a position W1, a position W2 and a position W3 of the fourth electrode group.

7. The touch position detector according to claim 6, wherein the identification module is further operable to:
   identify three combinations comprising the detected position information x of the first electrode group and the detected position information y of the second electrode group, in which a combination of the detected position information z of the third electrode group and the detected position information w of the fourth electrode group is calculated based on the following relationship:

$$\begin{bmatrix} x \\ y \end{bmatrix} = \begin{bmatrix} \cos\theta_2 & -\sin\theta_2 \\ \sin\theta_2 & \cos\theta_2 \end{bmatrix} \times \begin{bmatrix} z \\ w \end{bmatrix},$$

where, x is the detected position information of the first electrode group, y is the detected position information of the second electrode group, z is the detected position information of the third electrode group, and w is the detected position information of the fourth electrode group.

8. The touch position detector according to claim 1, wherein position information of each of the at least three groups of mutually-parallel electrodes comprises an axis component of an axis established in a direction perpendicular to the mutually-parallel electrodes.

9. A mobile electronic device, comprising the touch position detector according to claim 1.

10. The mobile electronic device according to claim 9, wherein the mobile electric device comprises a mobile phone.

11. A touch panel for identifying two or more touch points, comprising:
a first electrode group comprising a first layer of first electrodes arranged mutually parallel on a first plane;
a second electrode group comprising a second layer of second electrodes arranged mutually parallel on a second plane different from the first plane, and intersecting the first electrode group with a first angle in a planer view; and
a third electrode group comprising a third layer of third electrodes arranged mutually parallel on a third plane different from the first plane and the second plane, and intersecting the first electrode group with a second angle different from the first angle in a planer view.

12. The touch panel according to claim 11, wherein the first, second and third electrodes comprise transparent electrodes.

13. The touch panel according to claim 11, further comprising a dielectric body between the second electrodes and the third electrode group.

14. The touch panel according to claim 11, further comprising a processor module operable to identify at least two touched points on the touch panel.

15. The touch panel according to claim 11, further comprising: a fourth electrode group comprising fourth electrodes arranged mutually parallel on a fourth plane different from the first plane, the second plane and the third plane, and intersecting the first electrode group with a third angle different from the first angle and the second angle in a planer view.

16. The touch panel according to claim 15, further comprising a processor module operable to identify at least three touched points on the touch panel.

17. A method for detecting a plurality of touch points on a touch panel comprising:
providing a touch panel comprising at least three groups of a plurality of electrodes arranged mutually parallel, at least two of the at least three groups arranged at a predefined angle;
detecting a position information of each of the at least three groups of the electrodes corresponding to n touched positions respectively when n points are touched on the touch panel, comprising:
detecting a position X1 and a position X2 of a first electrode group;
detecting a position Y1 and a position Y2 of a second electrode group;
detecting a position Z1 and a position Z2 of a third electrode group;
calculating a calculated position Z3 based on the position X1 and the position Y1, and identify coordinates (X1, Y1), (X2, Y2) as one of the touched positions, if the calculated position Z3 is equal to at least one of the position Z1 and the position Z2; and
identifying coordinates (X1, Y2), (X2, Y1) as one of the touched positions, if the calculated position Z3 is not equal to at least one of the position Z1 and the position Z2; and
identifying the n touched positions based on the detected position information and a predefined angular relationship.

18. The method of claim 17, further comprising:
identifying three combinations comprising a detected position information of the first electrode group and the detected position information of the second electrode group, in which the combination of the detected position information of the third electrode group and the detected position information of a fourth electrode group is calculated based on the following relationship:

$$\begin{bmatrix} x \\ y \end{bmatrix} = \begin{bmatrix} \cos\theta & -\sin\theta_2 \\ \sin\theta & \cos\theta_2 \end{bmatrix} \times \begin{bmatrix} z \\ w \end{bmatrix},$$

where, x is the detected position information of the first electrode group, y is the detected position information of the second electrode group, z is the detected position information of the third electrode group, and w is the detected position information of the fourth electrode group.

19. The method of claim 17, wherein the calculated position Z3 is calculated based on the following relationship:

$Z3 = X1 \cdot \cos\theta_1 + Y1 \cdot \sin\theta_1.$

20. The method of claim 17, wherein
the first electrode group comprises first electrodes;
the second electrode group comprises second electrodes, wherein the first electrodes and the second electrodes intersect at approximately 90 degrees;
the third electrode group comprises third electrodes, wherein the first electrodes and the third electrodes form the predefined angle at a angle $\theta_2$; and
the touch panel further comprises a fourth electrode group comprising fourth electrodes,
wherein the third electrodes and the fourth electrodes intersect at approximately 90 degrees.

* * * * *